United States Patent
Xuan et al.

(10) Patent No.: US 9,008,136 B2
(45) Date of Patent: Apr. 14, 2015

(54) LASER SYSTEM CHILLER

(71) Applicant: AMS Research Corporation, Minnetonka, MN (US)

(72) Inventors: Rongwei Jason Xuan, Fremont, CA (US); Douglas L. Evans, Andover, MN (US)

(73) Assignee: AMS Research Corporation, Minnetonka, MN (US)

( * ) Notice: Subject to any disclaimer, the term of this patent is extended or adjusted under 35 U.S.C. 154(b) by 64 days.

(21) Appl. No.: 13/749,885

(22) Filed: Jan. 25, 2013

(65) Prior Publication Data

US 2013/0250985 A1    Sep. 26, 2013

Related U.S. Application Data

(60) Provisional application No. 61/614,124, filed on Mar. 22, 2012.

(51) Int. Cl.
| | |
|---|---|
| H01S 3/04 | (2006.01) |
| H01S 3/109 | (2006.01) |
| H01S 3/042 | (2006.01) |
| H01S 3/081 | (2006.01) |
| H01S 3/11 | (2006.01) |
| H01S 3/02 | (2006.01) |

(52) U.S. Cl.
CPC ............ *H01S 3/0407* (2013.01); *H01S 3/109* (2013.01); *H01S 3/042* (2013.01); *H01S 3/0815* (2013.01); *H01S 3/11* (2013.01); *H01S 3/025* (2013.01); *H01S 3/0401* (2013.01)

(58) Field of Classification Search
CPC ....... H01S 3/109; H01S 3/0407; H01S 3/042; H01S 3/0815; H01S 3/11; H01S 3/0401; H01S 3/025
USPC ............................................................ 372/35
See application file for complete search history.

(56) References Cited

U.S. PATENT DOCUMENTS

| | | | | |
|---|---|---|---|---|
| 4,163,199 | A | * | 7/1979 | Treanor ......................... 372/35 |
| 5,940,420 | A | * | 8/1999 | Blair et al. .................... 372/35 |
| 2003/0198264 | A1 | * | 10/2003 | Vetrovec et al. ............... 372/35 |
| 2009/0185592 | A1 | * | 7/2009 | Vetrovec ........................ 372/35 |

* cited by examiner

*Primary Examiner* — Yuanda Zhang
(74) *Attorney, Agent, or Firm* — Westman, Champlin & Koehler, P.A.

(57) ABSTRACT

A laser system includes a laser element, a pump source configured to input light to the laser element, a first cooling circuit and a second cooling circuit. The first cooling circuit includes a first pump configured to drive a first flow of cooling liquid through a first fluid pathway, a first primary heat exchanger configured to cool the first flow of cooling liquid, and a laser element heat exchanger configured to remove heat from the laser element using the first flow of cooling liquid. The second cooling circuit includes a second pump configured to drive a flow of cooling liquid through a second fluid pathway, a second primary heat exchanger configured to cool the second flow of cooling liquid, and a pump source heat exchanger configured to remove heat from the pump source using the first and second flows of cooling liquid.

12 Claims, 4 Drawing Sheets

LASER SYSTEM CHILLER

CROSS-REFERENCE TO RELATED APPLICATION

The present application is based on and claims the benefit of U.S. provisional patent application Ser. No. 61/614,124, filed Mar. 22, 2012, the content of which is hereby incorporated by reference in its entirety.

BACKGROUND

Embodiments of the present invention generally relate to laser systems and, more specifically, to a chiller for use in a laser system.

High power laser systems have a broad range of applications throughout the scientific, industrial and medical fields. Laser systems generally include a pump source, a laser element and a laser resonator. The pump source may include laser diodes or bars that generate pump energy or a light input to the laser element. The laser element absorbs the pump energy and emits laser light responsive to the absorbed energy. The laser resonator operates to generate a harmonic of the laser light.

The laser element is generally tuned to absorb pump energy having a wavelength that is within a specified operating band. The wavelength of the pump energy varies with a temperature of the laser diodes and the current supplied to the laser diodes. As a result, it is important to maintain the pump source within an operating temperature range to ensure that the pump energy is within the operating band of the laser element.

Laser systems utilize a chiller that operates to cool the pump source and the laser element. The chiller generally circulates cooled liquid through heat exchangers coupled to the pump source and the laser element. The liquid absorbs heat from the heat exchangers to cool the pump source and the laser element. Conventional chillers generally maintain the pump source and the laser elements at the same temperature.

SUMMARY

Embodiments of the invention are directed to a laser system comprising a chiller configured to maintain a laser element and a pump source within corresponding operating temperature ranges. In some embodiments, the laser system includes a laser element, a pump source configured to input light to the laser element, a first cooling circuit and a second cooling circuit. The first cooling circuit includes a first pump, a first primary heat exchanger and a laser element heat exchanger. The first pump is configured to drive a first flow of cooling liquid through a first fluid pathway. The first primary heat exchanger is configured to cool the first flow of cooling liquid. The laser element heat exchanger is configured to remove heat from the laser element using the first flow of cooling liquid. The second cooling circuit includes a second pump, a second primary heat exchanger and a pump source heat exchanger. The second pump is configured to drive a flow of cooling liquid through a second fluid pathway. The second primary heat exchanger is configured to cool the second flow of cooling liquid. The pump source heat exchanger is configured to remove heat from the pump source using the first and second flows of cooling liquid.

In accordance with other embodiments, the laser system includes a laser element, a pump source configured to input light to the laser element, a first heat exchanger, a pump source heat exchanger, a laser element heat exchanger and a pump. The first heat exchanger is configured to cool a first flow of cooling liquid. The pump source heat exchanger is configured to remove heat from the pump source using the first flow of cooling liquid. The laser element heat exchanger is configured to remove heat from the laser element using a second flow of cooling liquid. The pump is configured to drive the first and second flows of cooling liquid.

In accordance with other embodiments, the laser system includes a laser element, a pump source configured to input light to the laser element, a first cooling circuit and a second cooling circuit. The first cooling circuit includes a first pump, a laser element heat exchanger and a first reservoir. The first pump is configured to drive a first flow of cooling liquid through the first fluid pathway. The laser element heat exchanger is in the first fluid pathway and is configured to remove heat from the laser element using the first flow of cooling liquid. The first flow of cooling liquid is discharged from the first reservoir. The second cooling circuit includes a second pump, a primary heat exchanger, a pump source heat exchanger and a second reservoir. The second pump is configured to drive a second flow of cooling liquid. The primary heat exchanger is configured to cool the second flow of cooling liquid. The pump source heat exchanger is configured to remove heat from the pump source using at least a portion of the second flow of cooling liquid. The second reservoir is configured to receive the portion of the second flow of cooling liquid fed to the pump heat exchanger. The first reservoir is configured to receive a portion of the second flow of cooling liquid output from the primary heat exchanger.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
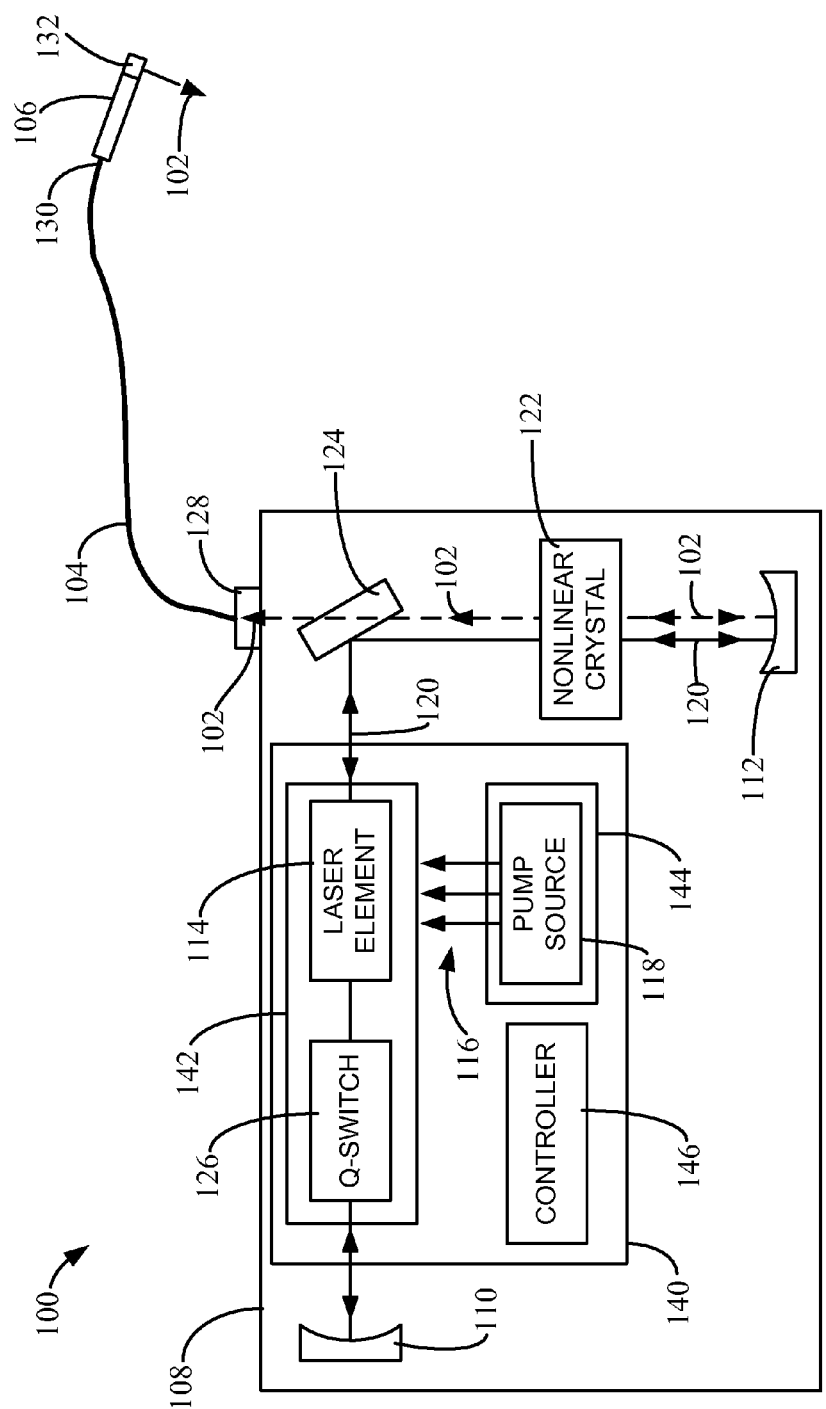
FIG. 1 is a simplified diagram of an exemplary surgical laser system in accordance with embodiments of the invention.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a simplified diagram of an exemplary laser system 100 in accordance with embodiments of the invention. While the depicted laser system 100 is a surgical laser system, it is understood that embodiments described herein are applicable to other types of laser systems as well. In general, the laser system 100 is configured to generate electromagnetic radiation 102 in the form of a laser beam, deliver the electromagnetic radiation through a laser fiber 104, such as a waveguide or optical fiber, to a probe tip 106 where it is discharged to a desired target, such as tissue of a patient.

The exemplary system 100 comprises a laser resonator 108. The laser resonator 108 may include a first resonator mirror 110, a second resonator mirror 112 and a laser element or rod 114. In one embodiment, the laser element 114 comprises a yttrium-aluminum-garnet crystal rod with neodymium atoms dispersed in the YAG rod to form a Nd:YAG laser element. Other conventional laser elements 114 may also be used.

The laser element 114 is pumped by a light input 116 from a pump source 118, such as a diode stack or other pump source, to produce laser light or beam 120 at a first frequency. The laser resonator 108 also includes a nonlinear crystal 122, such as a lithium borate (LBO) crystal or a potassium titanyl phosphate crystal (KTP), for generating a second harmonic of the laser beam 120 emitted by the laser element 114. The laser beam 120 inside the resonator 108 bounces back and forth between the first and second resonator mirrors 110 and 112, reflects off a folding mirror 124, and propagates through the laser element 114 and nonlinear crystal 122. The laser element 114 has optical gain at a certain wavelength and this determines the wavelength of the laser beam 120 inside the resonator 108. This wavelength is also referred to as the fundamental wavelength. For the Nd:YAG laser element 114, the fundamental wavelength is 1064 nm.

In one embodiment, the system 100 includes Q-switch 126 that converts the laser beam 120 to a train of short pulses with high peak power. These short pulses increase the conversion efficiency of the second harmonic laser beam 102, and increase the average power of the laser beam 102 outside the resonator 108.

When the laser beam 120 inside the resonator 108 propagates through the nonlinear crystal 122 in a direction away from the folding mirror 124 and toward the second resonator mirror 112, a beam 102 of electromagnetic radiation at the second harmonic wavelength is output from the crystal 122. The second resonator mirror 112 is highly reflective at both the fundamental and second harmonic wavelengths, and both beams 120 and 102 propagate back through the nonlinear crystal 122. On this second pass, more beams 102 at the second harmonic wavelength are produced. For example, the nonlinear crystal 122 can produce a laser beam 102 having a wavelength of approximately 532 nm (green) when a Nd:YAG rod is used as the laser element 114. One advantage of the 532 nm wavelength is that it is strongly absorbed by hemoglobin in blood and, therefore, is useful for cutting, vaporizing and coagulating vascular tissue.

The folding mirror 124 is highly reflective at the fundamental wavelength and is highly transmissive at the second harmonic wavelength. Thus, the laser beam 102 at the second harmonic passes through the folding mirror 124 and produces a second harmonic laser beam 102 outside the optical resonator 108. The laser fiber 104 connects to an optical coupler 128, which couples the beam 102 to the optical fiber 104 through a shutter mechanism (not shown). The beam 102 travels through the laser fiber 104 to the probe 106, which is coupled to a distal end 130 of the laser fiber 104. Embodiments of the probe 106 include components that support the distal end 130 of the laser fiber, such as an endoscope or cystoscope.

The probe 106 generally includes a probe tip 132 where the laser beam 102 is discharged. The probe tip 132 may include a fiber cap that is attached to the distal end of the optical fiber 104. The laser energy may be directed laterally from the probe tip by reflecting the laser energy off a polished beveled surface at the distal end of the laser fiber 104. The fiber cap generally seals a cavity containing a gas (or vacuum) that maintains the necessary refractive index difference for total internal reflection at the beveled surface.

The laser system 100 may be controlled by a surgeon through a suitable interface. The controls include a controller for selectively opening the shutter of the system 100 to allow for continuous or pulsed discharge of the laser beam 102 through the probe 106.

One embodiment of the laser system 100 includes a chiller 140, illustrated schematically in FIG. 1, formed in accordance with embodiments of the invention. The laser chiller 140 is configured to control the temperatures of the laser element 114 and the pump source 118. Conventional chillers maintain the laser element 114 at the same temperature as the pump source 118, even though they have different cooling requirements. This results in excess cooling power being applied to the laser element 114, lower laser conversion efficiency while the laser element 114 or the pump source 118 are not working at their optimal operating temperatures to match the pump spectra and laser element absorption peaks, or the laser element 114 works at too high cooling temperatures. Unlike such conventional chillers, embodiments of the chiller 140, can maintain the laser element 114 and the pump source 118 at different temperatures. This allows the laser resonator 108 to maintain the laser element 114 and the pump source 118 within their optimal operating temperature ranges, while reducing energy consumption and maximizing laser conversion efficiency. In some embodiments, the chiller 140 is configured to maintain the laser element 114 at a temperature of approximately 19° C., and maintain the pump source 118 within an operating temperature range of 21-34° C. This typically requires approximately 300 watts of cooling power to the laser element heat exchanger 142 and approximately 725 watts to the pump source heat exchanger 144.

The chiller 140 generally comprises a laser element heat exchanger 142 configured to cool the laser element 114 and a pump source heat exchanger 144 configured to cool the pump source 118. The heat exchangers utilized in the chiller 140 may be conventional heat exchangers used to exchange heat with a flow of cooling liquid, such as deionized water. In some embodiments, the chiller 140 is configured to cool the Q-switch 126 using the pump source heat exchanger 142, or another heat exchanger that shares a flow of cooling liquid with the pump source heat exchanger 142. Accordingly, while embodiments of the chiller 140 may only be described as operating to cool the laser element 114, variations of these embodiments include the cooling of both the Q-switch 126 and laser element 114.

In one embodiment, the chiller 140 includes a controller 146 representing one or more processors and memory containing instructions executable by the one or more processors. The controller 141 is configured to perform method steps and control functions described herein, such as processing signals from sensors and controlling pumps and valves.

Additional embodiments of the chiller 140 will be discussed with reference to the schematic diagrams provided in FIGS. 2-4. Some details, such as refrigeration components, temperature and flow sensors, water deionizing circuits, filters, and other components are not illustrated in order to simplify the drawings.

Figure 2:
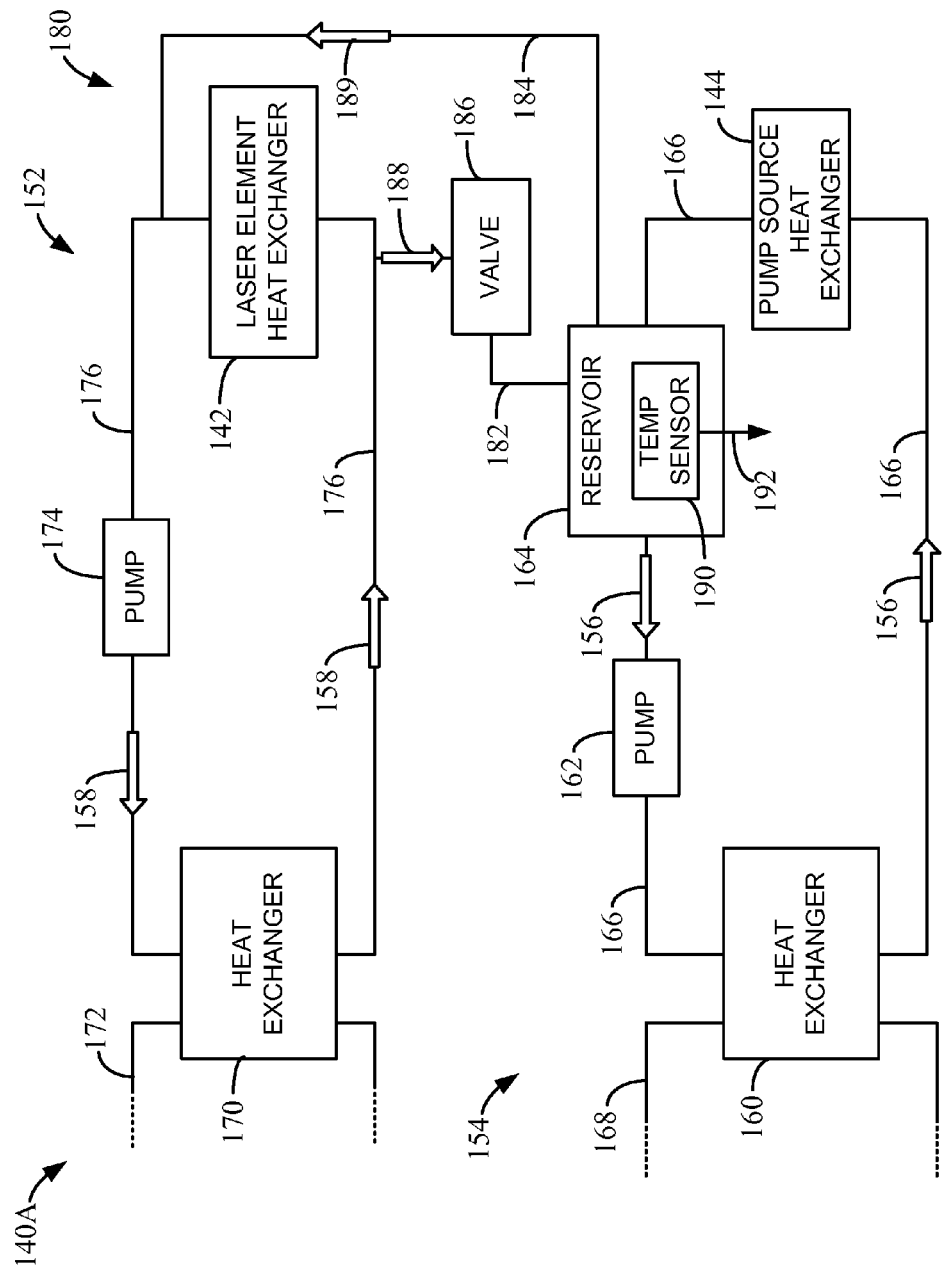
FIGS. 2-4 are schematic diagrams of a chiller formed in accordance with embodiments of the invention.

FIG. 2 is a schematic diagram of a chiller 140A in accordance with embodiments of the invention. In some embodiments, the chiller 140A comprises a cooling circuit 152 that operates to cool the laser element 114 and a cooling circuit 154 that operates to cool the pump source 118. The cooling circuit 152 generally operates to maintain the laser element 114 at a lower temperature than the temperature of pump source 118 maintained by the cooling circuit 154. This allows the laser resonator 108 to operate at a higher efficiency than conventional laser resonators that maintain the Q-switch, the laser element, and the pump source at generally the same temperature, or provide the same amount of cooling power to the components.

The cooling circuit 154 is generally configured to provide a flow of cooling liquid 156 to the pump source heat exchanger 144 to maintain the pump source 118 within a desired operating temperature range, such as 21-34° C. As mentioned above, this may require approximately 725 watts of cooling power to the pump source heat exchanger 144, or to the flow of cooling liquid 156. The cooling circuit 152 generally operates to provide a flow of cooling liquid 158 to the laser element heat exchanger 142 to maintain the laser element 114, and optionally the Q-switch 126, within a desired operating temperature range. In one embodiment, the cooling circuit 152 is configured to maintain the laser element 114 at approximately 19° C. As mentioned above, this typically requires approximately 300 watts of cooling power to the laser element heat exchanger 142.

In accordance with some embodiments of the chiller 140A, the cooling circuit 154 includes a primary heat exchanger 160, a pump 162, and a reservoir 164. The pump 162 drives the flow of cooling liquid 156 from the reservoir 164 along a fluid pathway 166, which travels through the primary heat exchanger 160 and the pump source heat exchanger 144. The heat exchanger 160 receives a flow of cooling refrigerant through a cooling line 168, which is used to cool the flow of cooling liquid 156, in accordance with conventional heat exchangers. The passage of the flow of cooling liquid 156 through the pump source heat exchanger 144 cools the pump source 118 to maintain it within the desired operating temperature range. The flow of cooling liquid 156 discharged from the pump source heat exchanger 144 is delivered to the reservoir 164.

In some embodiments, the heat exchanger 160 cannot, by itself, fulfill the cooling needs of the heat exchanger 144. That is, the heat exchanger 160 is configured to provide fewer watts of cooling power than is required by the pump source heat exchanger 144 to maintain the pump source 118 within the desired operating temperature range. For instance, the heat exchanger 160 may be configured to provide 550 watts of cooling power, while the pump source heat exchanger 144 requires 725 watts of cooling power to maintain the pump source 118 within the desired operating range. In one embodiment, the cooling power provided by the cooling circuit 154 is supplemented by the cooling circuit 152 to provide sufficient cooling power to maintain the pump source 118 within the desired operating temperature range.

In one embodiment, the cooling circuit 152 includes a primary heat exchanger 170 that receives a flow of cooled refrigerant through line 172, which is used to cool the flow of cooling liquid 158 driven by a pump 174 through a fluid pathway 176. At least a portion of the flow of cooling liquid 158 is driven through the laser element heat exchanger 142 by the pump 164 to maintain the laser element 114 within the desired operating temperature range.

In one embodiment, the heat exchanger 170 is configured to provide more cooling power than required by the heat exchanger 142 to maintain the laser element 114 within the desired temperature range. For instance, the heat exchanger 170 may be configured to provide 550 watts of cooling power, when the laser element heat exchanger only needs 300 watts of cooling power. In one embodiment, the excess cooling power generated by the heat exchanger 170 is used to supplement the cooling circuit 154 to ensure that the pump source heat exchanger 144 receives sufficient cooling power to maintain the pump source 118 within the desired temperature range.

In one embodiment, the additional cooling required by the cooling circuit 154 is provided by the cooling circuit 152 through the exchange of cooled liquid through a fluid exchange circuit 180. The fluid exchange circuit 180 includes a delivery line 182 connecting the circuit 152 to the reservoir 164, and a return line 184 between the reservoir 164 and the circuit 152. A valve 186 controls the flow of a portion 188 of the flow of cooling liquid 158 to the reservoir 164 through the line 182.

When the temperature of the water flowing through the fluid pathway 166 of the circuit 154 is sufficient to provide the cooling needs of the pump source heat exchanger 144, the valve 186 is closed. However, when the temperature of the liquid in the pathway 166 is insufficient to provide the cooling needs of the pump source heat exchanger 144, the valve 186 is opened to allow a portion 188 of the flow of cooling liquid 158 to flow from the fluid pathway 176 of the circuit 152 into the reservoir 164 through the delivery line 182. This flow of cooling liquid 188 cools the liquid in the reservoir 164. In one embodiment, a flow of liquid 189 from the reservoir 164 is delivered back to the circuit 152 through the return line 184 responsive to the opening of the valve 186.

This operation cools the liquid in the reservoir 164 and the flow of cooling liquid 156 driven from the reservoir 164 into the fluid pathway 166 by the pump 162. As a result, the flow of cooling liquid 188 provides a cooling boost to the flow of cooling liquid 156 that allows the pump source heat exchanger 144 to maintain the pump source 118 within the desired operating temperature range.

In one embodiment, the opening and closing of the valve 186 is controlled using a temperature sensor 190 (e.g., thermocouple) that measures the temperature of the water within the reservoir 164. The sensor 190 provides an output signal 192 that is indicative of a temperature of the liquid in the reservoir 164. The controller 146 (FIG. 1) processes the signal 192 to determine whether the temperature of the liquid in the reservoir 164 is above or below a threshold temperature. If the temperature of the liquid within the reservoir 164 has risen above the threshold temperature, the valve 186 is opened to provide the flow of cooling liquid 188 to the reservoir 164 until the temperature of the liquid in the reservoir 164 drops below the threshold temperature. A corresponding flow of liquid 189 may be returned to the circuit 152 through the return line 184. When the temperature of the liquid in the reservoir 164 drops below the threshold temperature, the valve 186 is closed and the cooling circuits 142 and 144 are operated as described above.

It is understood, that the temperature sensor 190 could be replaced by a temperature sensor configured to detect other temperatures in the system 100 and provide an output signal indicative of the temperature to the controller 146 for use in determining whether the valve should be opened or closed, such as the temperature of the pump source 118, the temperature of the flow of cooling liquid 156 either upstream or downstream from the pump source heat exchanger relative to the flow of cooling liquid 156, or other temperature.

Figure 3:
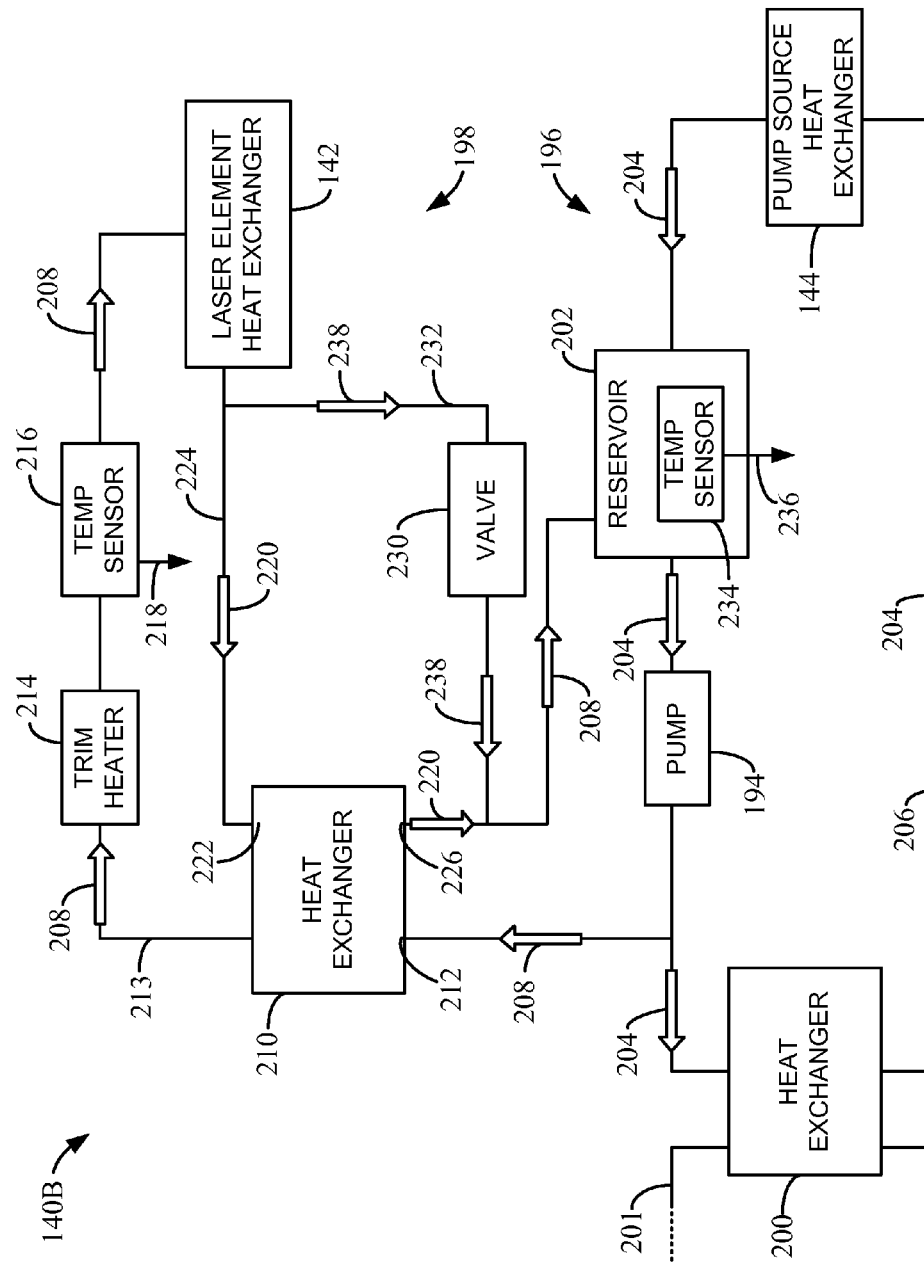

FIG. 3 is a schematic diagram of a chiller 140B in accordance with embodiments of the invention. In some embodiments, the chiller 140B utilizes a single pump 194 to drive flows of cooling liquid through a cooling circuit 196 configured to cool the pump source 118, and a cooling circuit 198 configured to cool the laser element 114. The circuit 196 includes a primary heat exchanger 200, the pump source heat exchanger 144, and a reservoir 202. The pump 194 drives a flow of cooling liquid 204 from the reservoir 202 along a fluid pathway 206 of the circuit 196. The heat exchanger 200 receives a flow of cooling refrigerant through a cooling line 201, which is used to cool the flow of liquid 204, in accordance with conventional heat exchangers. The flow of cooling liquid 204 is cooled by the heat exchanger 200 and travels through the pump source heat exchanger 144 to cool the pump source 118. The flow of cooling liquid 204 then returns to the reservoir 202.

In some embodiments, the cooling circuit 198 includes a heat exchanger or economizer 210 having an input 212 that receives a flow of cooling liquid 208 from the circuit 196 driven by the pump 194 along a pathway 213. The flow 208 travels through the laser element heat exchanger 142 to cool the laser element 114 and, optionally, the Q-switch 126. In some embodiments, the flow 208 is returned to the reservoir 202.

In some embodiments, the circuit 198 includes a trim heater 214 and a temperature sensor 216 used to control the temperature of the flow 208 through the laser element heat exchanger 142. The temperature sensor 216 is configured to output a signal 218 that is indicative of a temperature of the flow of cooling liquid 208. The controller 146 processes the signal 218 to determine whether the flow of cooling liquid 208 should be warmed by the trim heater 214 to ensure that the flow 208 maintains the laser element 114 within the desired operating temperature range. For instance, if the temperature of the flow 208 as indicated by the signal 218 drops below a threshold temperature, the controller 146 increases the heating of the flow 208 by the trim heater 214. Likewise, the controller 146 decreases the heating of the flow 208 by the trim heater 214 or deactivates the trim heater 214 when the signal 218 indicates that the temperature of the flow 208 is above the threshold temperature or within a desired temperature range.

It is understood, that the sensor 216 could be replaced by a temperature sensor configured to detect other temperatures in the system 100 or chiller 140B, and provide an output signal indicative of the temperature to the controller 146 for use in determining whether the flow of cooling liquid 208 should be heated by the heater 214, such as the temperature of the laser element 114, the temperature of the laser element heat exchanger 142, the temperature of the flow of cooling liquid 208 downstream of the laser element heat exchanger 142 relative to the flow 208, or other temperature.

In some embodiments, a portion 220 of the flow 208 discharged from the laser element heat exchanger 142 is delivered back to an input 222 of the heat exchanger 210 along a fluid flow path 224 to temper or preheat the flow 208 entering input 212 prior to discharging the flow 220 through an output 226 of the heat exchanger 210 and returning the flow 208 to the reservoir 202 along the fluid pathway 228. This ability to preheat the flow 208 entering the input 212 of the heat exchanger 210 may eliminate the need for the trim heater 214.

In some embodiments, the volume of the flow 220 is controlled by a valve 230 in a pathway 232, which bypasses the heat exchanger 210. In some embodiments, the valve 230 is controlled in response to a temperature of the flow 208 sensed by the temperature sensor 216 or other sensor.

In some embodiments, a temperature sensor 234 is placed in the reservoir 202 to sense a temperature of the liquid in the reservoir 202. The temperature sensor 234 includes an output signal 236 that is processed by the controller 146 to determine the volume of the flow 220 that should be delivered through the heat exchanger 210 along the pathway 224 to maintain the temperature of the liquid in the reservoir 202 within the desired range. The controller 146 adjusts the valve 230 to a more open position to increase a flow 238 through the pathway 232 and reduce the flow 220 through the heat exchanger 210 along pathway 224 when the temperature of the liquid in the reservoir 202 drops below a threshold temperature or temperature range, to warm the liquid in the reservoir 202. The controller 146 adjusts the position of the valve 230 to a more closed position to reduce the flow 238 through the pathway 232 and increase the flow 220 through the heat exchanger 210 along the pathway 224 when the temperature of the liquid in the reservoir 202 rises above a threshold temperature or temperature range, to cool the liquid in the reservoir 202.

It is understood, that the sensor 234 could be replaced by a temperature sensor configured to detect other temperatures in the system 100 or chiller 140B and provide an output signal indicative of the temperature to the controller 146 for use in determining whether the valve 230 should be opened or closed, such as the temperature of the pump source 118, the temperature of the flow of cooling liquid 208, or portion thereof, either upstream or downstream from the pump source heat exchanger 142 relative to the flow of cooling liquid 208, or other temperature.

Figure 4:
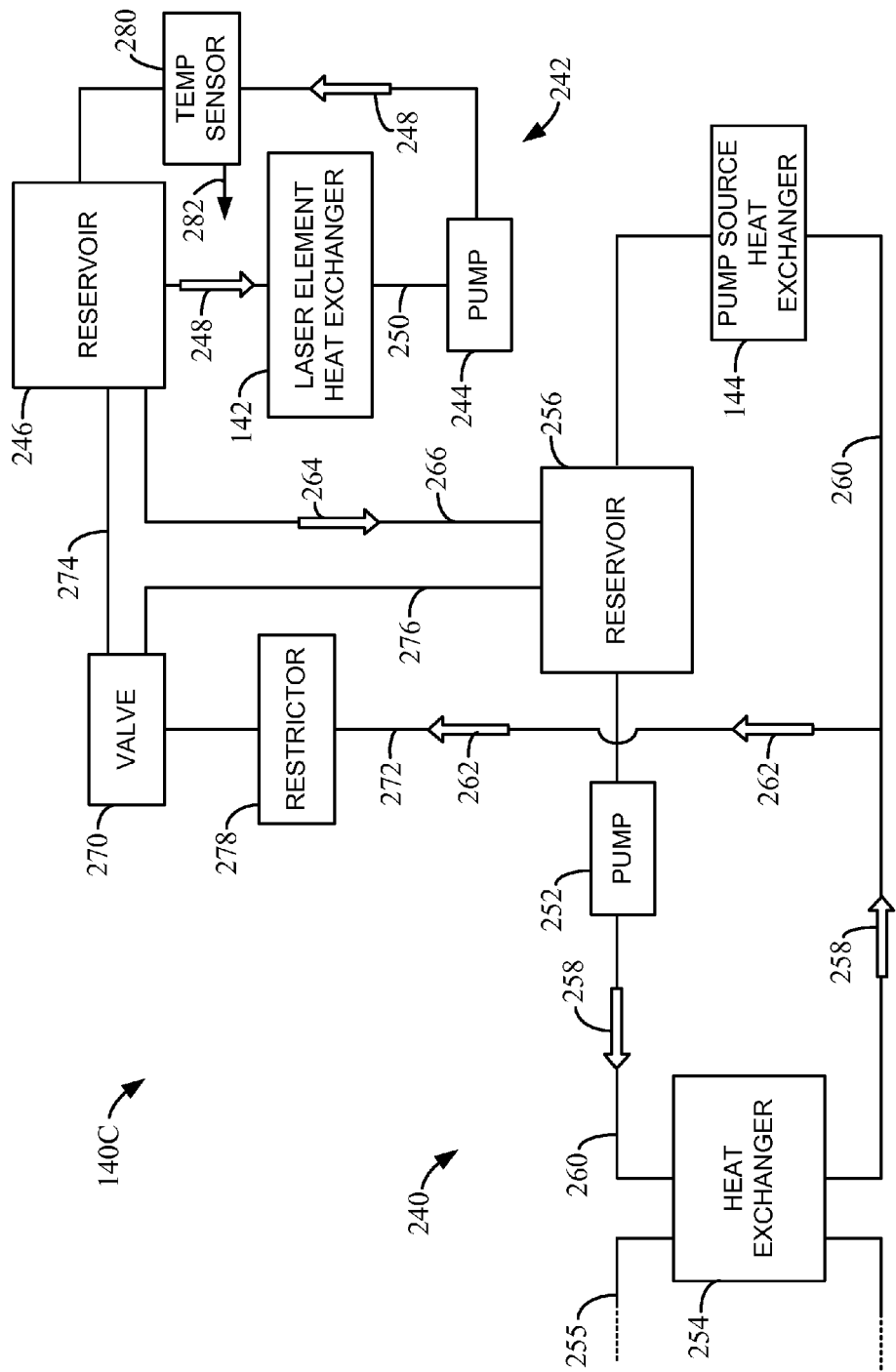

FIG. 4 is a schematic diagram of a chiller 140C in accordance with embodiments of the invention. In some embodiments, the chiller 140C comprises a cooling circuit 240 configured to cool the pump source 118, and a cooling circuit 242 configured to cool the laser element 114. The cooling circuit 242 comprises a pump 244, a laser element heat exchanger 142, and a reservoir 246. The pump 244 drives a flow of cooling liquid 248 from the reservoir 246 through a first fluid pathway 250. The laser element heat exchanger 142 is in the fluid pathway 250 and removes heat from the laser element 114 using the flow 248. The flow 248 is then returned to the reservoir 246.

The cooling circuit 240 includes a pump 252, a primary heat exchanger 254, a pump source heat exchanger 144, and a reservoir 256. The pump 252 drives a flow of cooling liquid 258 from the reservoir 256 through a fluid pathway 260. The heat exchanger 254 receives a flow of cooling refrigerant through a cooling line 255, which is used to cool the flow of liquid 258, in accordance with conventional heat exchangers. At least a portion of the flow 258 travels through the pump source heat exchanger 144 where it is used to remove heat from the pump source 118 before returning to the reservoir 256. In some embodiments, the temperature of the flow of cooling liquid 258 traveling through the pump source heat exchanger 144 is sufficient to provide the desired cooling power to the pump source 118 to maintain the pump source 118 within the desired operating temperature range.

In some embodiments, the circuit 242 does not include a primary heat exchanger to cool the flow 248. Rather, a portion 262 of the flow 258 is provided to the reservoir 256 after it is cooled by the heat exchanger 254 to cool the liquid in the reservoir 246 and enable the desired cooling of the laser element by the flow 248. In some embodiments, a flow of liquid 264 from the reservoir 246 is delivered to the reservoir 256 through a fluid pathway 266 to maintain the reservoirs at desired levels.

In one embodiment, the chiller 140C includes a three-way valve 270, or equivalent fluid flow control, that receives the flow of liquid 262 in a pathway 272. In one embodiment, the valve 270 is configured to direct portions of the flow 262 in the pathway 272 to the reservoir 246 through a pathway 274, or to the reservoir 256 through a pathway 276. In one embodiment, a flow restrictor 278 is placed in line with the pathway 272 to control the rate of the flow 262 through the pathway 272 such that the desired flow rate of liquid is provided to the heat exchanger 254 through the pathway 260.

When the temperature of the flow of liquid 248 traveling through the laser element heat exchanger 142 is sufficient to provide the desired cooling of the laser element 114 and, optionally, the Q-switch 126, the valve 270 is set to deliver the flow of cooling liquid 262 from pathway 272 to pathway 276 where it is delivered back to the reservoir 256. When the temperature of the flow of liquid 248 through the laser element heat exchanger 142 is insufficient to provide the desired cooling of the laser element 114, the valve 270 directs the flow of liquid 262, or a portion thereof, from the pathway 272 to the pathway 274 and into the reservoir 246. This cools the liquid in the reservoir 246 and provides additional cooling power to the laser element heat exchanger 142 to meet the cooling demands of the laser element 114. In some embodiments, the flow of liquid 264 is discharged from the reservoir 246 back to the reservoir 256 through the pathway 266 responsive to the delivery of the flow of liquid 262, or a portion thereof, to the reservoir 246.

In one embodiment, the cooling circuit 242 includes a temperature sensor 280 having an output signal 282 indicative of a temperature of the flow 248, or other temperature relevant to determining whether the laser element 114 is being maintained within the desired operating temperature range. The controller 146 processes the signal 282 to determine whether the valve 270 should allow for more or less flow of liquid to the reservoir 246 along the pathway 274. When the signal 282 indicates that more cooling power is required for the laser element 114, the controller 146 adjusts the valve 270 to allow for a greater portion of the flow 262 to travel to the reservoir 246. When the signal 282 indicates that less cooling power is required for the laser element 114, the controller 146 adjusts the valve 270 to reduce the portion of the flow 262 being delivered to the reservoir 246. In this manner, the cooling circuit 140C can maintain the laser element 114 at a different temperature than the pump source 118.

Although the present invention has been described with reference to preferred embodiments, workers skilled in the art will recognize that changes may be made in form and detail without departing from the spirit and scope of the invention.

What is claimed is:

1. A laser system comprising:
a laser element;
a pump source configured to input light to the laser element;
a first cooling circuit comprising:
a first pump configured to drive a first flow of cooling liquid through a first fluid pathway;
a first primary heat exchanger in the first fluid pathway configured to cool the first flow of cooling liquid; and
a laser element heat exchanger configured to remove heat from the laser element using the first flow of cooling liquid; and
a second cooling circuit comprising:
a second pump configured to drive a flow of cooling liquid through a second fluid pathway;
a second primary heat exchanger in the second fluid pathway configured to cool the second flow of cooling liquid; and
a pump source heat exchanger configured to remove heat from the pump source using the first and second flows of cooling liquid;
wherein:
a cooling power delivered from the first and second cooling circuits to the pump source is configured to maintain the pump source within a first temperature range;
a cooling power delivered from a second cooling circuit to the laser element is configured to maintain the laser element within a second temperature range; and
the first and second temperature ranges are different.

2. The system of claim 1, further comprising a valve configured to divert a portion of the first flow of cooling liquid to the second cooling circuit through a feed line.

3. The system of claim 2, wherein:
the second cooling circuit comprises a reservoir of cooling liquid; and
the portion of the first flow of cooling liquid is received in the reservoir.

4. The system of claim 3, wherein:
the system comprises a temperature sensor having an output signal indicative of a temperature; and
the system comprises a controller configured to actuate the valve between open and closed positions responsive to the output signal.

5. The system of claim 2, further comprising a return line through which cooling liquid is returned to the first cooling circuit from the reservoir.

6. The system of claim 1, wherein the first temperature range is approximately 21-34° C.

7. A laser system comprising:
a laser element;
a pump source configured to input light to the laser element;
a first cooling circuit comprising:
a first pump configured to drive a first flow of cooling liquid through a first fluid pathway;
a first primary heat exchanger in the first fluid pathway configured to cool the first flow of cooling liquid; and
a laser element heat exchanger configured to remove heat from the laser element using the first flow of cooling liquid;
a second cooling circuit comprising:
a second pump configured to drive a flow of cooling liquid through a second fluid pathway;
a second primary heat exchanger in the second fluid pathway configured to cool the second flow of cooling liquid; and
a pump source heat exchanger configured to remove heat from the pump source using the first and second flows of cooling liquid; and
a valve configured to divert a portion of the first flow of cooling liquid to the second cooling circuit through a feed line.

8. The system of claim 7, wherein:
the second cooling circuit comprises a reservoir of cooling liquid; and the portion of the first flow of cooling liquid is received in the reservoir.

9. The system of claim 7, wherein:
the system comprises a temperature sensor having an output signal indicative of a temperature; and
the system comprises a controller configured to actuate the valve between open and closed positions responsive to the output signal.

10. The system of claim 8, further comprising a return line through which cooling liquid is returned to the first cooling circuit from the reservoir.

11. The system of claim 7, wherein:
a cooling power delivered from the first and second cooling circuits to the pump source is configured to maintain the pump source within a first temperature range;
a cooling power delivered from a second cooling circuit to the laser element is configured to maintain the laser element within a second temperature range; and
the first and second temperature ranges are different.

12. The system of claim 11, wherein the first temperature range is approximately 21-34° C.

* * * * *

UNITED STATES PATENT AND TRADEMARK OFFICE
CERTIFICATE OF CORRECTION

| | | |
|---|---|---|
| PATENT NO. | : 9,008,136 B2 | Page 1 of 1 |
| APPLICATION NO. | : 13/749885 | |
| DATED | : April 14, 2015 | |
| INVENTOR(S) | : Xuan et al. | |

It is certified that error appears in the above-identified patent and that said Letters Patent is hereby corrected as shown below:

IN THE SPECIFICATION:

Column 3, Line 15, delete "probe tip 106" and insert -- probe tip 132 --, therefor.

Column 6, Line 5, delete "pump 164" and insert -- pump 174 --, therefor; In Column 6, Line 64, delete "cooling circuits 142 and 144" and insert -- cooling circuits 152 and 154 --, therefor.

Column 9, Line 51, delete "circuit 140C" and insert -- circuit 242 --, therefor.

Signed and Sealed this
Nineteenth Day of January, 2016

Michelle K. Lee
*Director of the United States Patent and Trademark Office*